United States Patent
Shentu (10) Patent No.: US 10,473,204 B2
(45) Date of Patent: Nov. 12, 2019

(54) HEAVY-DUTY DRIVE AXLE

(71) Applicant: ZHEJIANG LINIX MOTOR CO., LTD., Dongyang, Zhejiang Province (CN)

(72) Inventor: Jun Shentu, Dongyang (CN)

(73) Assignee: ZHEJIANG LINIX MOTOR CO., LTD., Dongyang (CN)

( * ) Notice: Subject to any disclaimer, the term of this patent is extended or adjusted under 35 U.S.C. 154(b) by 20 days.

(21) Appl. No.: 15/871,885

(22) Filed: Jan. 15, 2018

(65) Prior Publication Data
US 2019/0032761 A1  Jan. 31, 2019

(30) Foreign Application Priority Data
Jul. 31, 2017 (CN) .......................... 2017 1 0638702

(51) Int. Cl.
*F16H 48/40* (2012.01)
*F16H 37/08* (2006.01)
(Continued)

(52) U.S. Cl.
CPC ............ *F16H 48/40* (2013.01); *B60K 1/00* (2013.01); *B60K 7/0007* (2013.01); *B60K 17/16* (2013.01);
(Continued)

(58) Field of Classification Search
CPC .... F16H 37/082; F16H 37/0813; F16H 48/40; F16H 57/037
See application file for complete search history.

(56) References Cited

U.S. PATENT DOCUMENTS 6,027,630 A * 2/2000 Cohen ................ B81C 1/00126
                                                         205/135
2011/0218073 A1* 9/2011 Platt ....................... B60K 17/16
                                                         475/220
(Continued)

FOREIGN PATENT DOCUMENTS

EP         0163937 B1 *  8/1990  ............ F16C 33/201

OTHER PUBLICATIONS

English Translation of EP 0163937 B1 (Year: 1990).*

*Primary Examiner* — Jeffrey A Shapiro
(74) *Attorney, Agent, or Firm* — Jiwen Chen (57) ABSTRACT

The present invention discloses a heavy-duty drive axle comprising a reduction gearbox and a drive motor; a differential case is provided within the reduction gearbox; a motor output shaft of the drive motor is linked with a first output shaft and a second output shaft via the differential case; the differential case consists of a differential holder, a connecting pole, a linkage gear and four bevel gears; each bevel gear is meshed with two bevel gears; the bevel gears comprise a first bevel gear, a second bevel gear, a third bevel gear and a fourth bevel gear, the first bevel gear and the second bevel gear are arranged oppositely, and the third bevel gear and the fourth bevel gear are arranged oppositely and sheathed on the connecting pole; the connecting pole is fixed with the differential holder; a cavity is formed within the differential holder; a through hole for fitting with the connecting pole is formed on each of an upper side and a lower side of the differential holder, and a third shaft hole and an opening are separately formed on a left side and a right side of the differential holder; the linkage gear is fixed at the opening of the differential holder; and the motor output shaft is linked with the linkage gear.

7 Claims, 5 Drawing Sheets

(51) Int. Cl.

| | | |
|---|---|---|
| *F16H 57/037* | (2012.01) | |
| *B60K 1/00* | (2006.01) | |
| *B60K 17/16* | (2006.01) | |
| *F16H 48/08* | (2006.01) | |
| *F16H 57/04* | (2010.01) | |
| *B60K 7/00* | (2006.01) | |
| *F16C 17/02* | (2006.01) | |
| *F16H 48/38* | (2012.01) | |

(52) U.S. Cl.
CPC ............ B60K 17/165 (2013.01); F16C 17/02 (2013.01); F16H 37/082 (2013.01); F16H 37/0813 (2013.01); F16H 48/08 (2013.01); F16H 57/037 (2013.01); F16H 57/0428 (2013.01); *B60K 2001/001* (2013.01); *B60K 2007/0038* (2013.01); *B60Y 2410/10* (2013.01); *F16C 2326/06* (2013.01); *F16H 2048/082* (2013.01); *F16H 2048/385* (2013.01)

(56) References Cited

U.S. PATENT DOCUMENTS

| | | | | |
|---|---|---|---|---|
| 2015/0119181 | A1* | 4/2015 | Fox | ........................ B60K 1/00 475/150 |
| 2016/0084308 | A1* | 3/2016 | Gorges | .................. F16C 33/102 384/430 |
| 2016/0312828 | A1* | 10/2016 | Moratz | ............... F16C 33/6696 |
| 2017/0307058 | A1* | 10/2017 | Chu | ........................ F16H 48/36 |
| 2018/0031097 | A1* | 2/2018 | Matsuura | ............ F16H 37/0813 |

* cited by examiner

HEAVY-DUTY DRIVE AXLE

This application claims the priority benefit of Chinese Application No. 201710638702.6, filed Jul. 31, 2017, which is hereby incorporated by reference.

TECHNICAL FIELD OF THE INVENTION

The present invention relates to a drive axle.

BACKGROUND OF THE INVENTION

The fixation structure of bevel gears inside the existing drive axles is very complicated. As a result, the drive axles are large in size and their assembly is very tedious. Furthermore, there are also problems such as low precision and unstable transmission.

SUMMARY OF THE INVENTION

An object of the present invention is to provide a heavy-duty drive axle which has the advantages of convenient assembly, small size, high precision and stable transmission.

For this purpose, the present invention employs the following technical solutions. A heavy-duty drive axle is provided, comprising a reduction gearbox and a drive motor; wherein a differential case is provided within the reduction gearbox; a first shaft hole for allowing a first output shaft to pass therethrough and a second shaft hole for allowing a second output shaft to pass therethrough are formed on the reduction gearbox; a motor output shaft of the drive motor is linked with the first output shaft and the second output shaft via the differential case; the differential case consists of a differential holder, a connecting pole, a linkage gear and four bevel gears; each bevel gear is meshed with two bevel gears; the bevel gears comprise a first bevel gear, a second bevel gear, a third bevel gear and a fourth bevel gear, the first bevel gear and the second bevel gear are arranged oppositely, and the third bevel gear and the fourth bevel gear are arranged oppositely and sheathed on the connecting pole; the connecting pole is fixed with the differential holder; a cavity is formed within the differential holder; a through hole for fitting with the connecting pole is formed on each of an upper side and a lower side of the differential holder, and a third shaft hole and an opening are separately formed on a left side and a right side of the differential holder; the bevel gear is placed in the cavity via the opening; the linkage gear is fixed at the opening of the differential holder; the first output shaft passes through the linkage gear to be fixed with the first bevel gear in the cavity, the second output shaft passes through the third shaft hole and is fixed with the second bevel gear; and the motor output shaft is linked with the linkage gear.

In the present invention, the four bevel gears are assembled together by the coordination of the differential holder, the connecting pole and the linkage gear, and the four bevel gears are relatively fixed by the meshing of the four bevel gears with each other and the coordination with the connecting pole. During the assembly of the drive axle of the present invention, the differential case is placed within the reduction gearbox, and then the first output shaft and the second output shaft are assembled and fixed. The assembly process is quite convenient, the structure is simple, and the size of the reduction gearbox can be reduced. Furthermore, the manufacturing and machining of the reduction gearbox becomes simpler. Sealing the opening of the differential holder by the linkage gear prevents the disengagement of the first bevel gear. The linkage gear is also used for linking with the motor output shaft. The coordination of the connecting pole and the four bevel gears ensures that the other output shaft can still rotate when one output shaft is locked, so that the steering of the scooter is realized. Furthermore, the non-locked output shaft can be allowed to rotate at double speed.

Preferably, an annular protuberance, within which the third shaft hole is located, is formed on the left side of the differential holder; an annular boss is formed on the linkage gear; the first output shaft passes through the annular boss to be fixed with the first bevel gear; and both the annular protuberance and the annular boss are fixed with an inner ring of a first bearing, and an outer ring of the first bearing is fixed with an inner wall of the reduction gearbox. Such an arrangement is designed for the fixation of the differential case with the reduction gearbox. After the first bearing is mounted within the reduction gearbox, the fixation of the differential case with the reduction gearbox can be realized simply by pressing the entire differential case.

Preferably, a sleeve bearing is fixed within each of the annular protuberance and the annular boss; one sleeve bearing is used for coordinating with the first output shaft and the other sleeve bearing is used for coordinating with the second output shaft; an adjustment tank running through an interior sleeve bearing hole and an exterior sleeve bearing hole is formed on the sleeve bearing, and the adjustment tank runs through end faces of two ends of the sleeve bearing in the axial direction of the sleeve bearing; the sleeve bearing is of a bilayer structure, and the sleeve bearing comprises a powder metallurgical layer in an inner layer and a low-carbon steel sleeve in an outer layer; the powder metallurgical layer comprises a first segment composed of polytetrafluoroethylene and lead, and a second segment composed of tin-bronze powder, and the second segment is located between the first segment and the low-carbon steel sleeve; and an electroplating layer is formed on the low-carbon steel sleeve. The electroplated layer is provided for improving the rust-proof performance of the sleeve bearing. Since the outer layer of the sleeve bearing is made of low-carbon steel sleeve, it is good in toughness and convenient for crimping. The tin-bronze powder layer provides the sleeve bearing with high mechanical property, wear-resistant property and corrosion resistance performance. The polytetrafluoroethylene and lead layers provide the sleeve bearing with high temperature resistance performance, low friction coefficient which facilitates the rotation of the first output shaft and the second output shaft, and high wear-resistant property so that the service life is longer.

Preferably, the linkage gear is fixed with the differential holder via fastening screws and the linkage gear seals the opening; a window is formed on each of a front side and a rear side of the differential holder, and the windows are located relatively on a radial outer side of the first output shaft; several process holes for fitting the fastening screws are formed on both the differential holder and the linkage gear, and the process holes for the differential holder are communicated with the windows; and the fastening screws pass through the process holes with head portions of the fastening screws being located within the windows. The arrangement of the window facilitates the assembly of the fastening screws. Furthermore, the window is used for accommodating the head portion of the fastening screws. This reduces the space for the entire differential case so that a smaller reduction gearbox can be used in the drive axle.

Preferably, two first gaskets are sheathed on the connecting pole, one of which is limited between the third bevel gear and the inner wall of the differential holder and the other one of which is limited between the fourth bevel gear and the inner wall of the differential holder; a second gasket is provided between the second bevel gear and the inner wall of the differential holder, and a third gasket is provided between the linkage gear and the first bevel gear; a first annular groove for accommodating the second gasket is formed on the inner wall of the differential holder; an inner diameter of the second gasket is greater than an outer diameter of the second output shaft, and an inner diameter of the third gasket is greater than an outer diameter of the first output shaft; a second annular groove for accommodating the third gasket is formed on the linkage gear; part of the second bevel gear is located within the first annular groove, and part of the first bevel gear is located within the second annular groove. The first gaskets, the second gasket and the third gasket are provided to prevent the wear of the bevel gears, and also to retain the position of the bevel gears to prevent the bevel gears from axial endplay. By the arrangement of the first annular groove and the second annular groove, the assembly of the first bevel gear and the second bevel gear is more convenient, so that the first bevel gear and the second bevel gear are conveniently positioned.

Preferably, both an inner hole for the first bevel gear and an inner hole for the second bevel gear are fitted with splines, and spline grooves for fitting the splines are formed at an end of the first output shaft and an end of the second output shaft; and an end face of the linkage gear close to the differential holder is recessed inward to form an accommodating groove, an inner edge of the accommodating groove is the same as an edge of the differential holder in shape and size, and part of the differential holder is located within the accommodating groove. Instead of fixing the bevel gears and the shafts by pins, by using splines, the fixation of the first bevel gear with the first output shaft is more convenient, and the fixation of the second bevel gear with the second output shaft is more convenient. Furthermore, the precision of fixation of the shafts and the bevel gears can be increased, the transmission efficiency can be improved, and the noise can be reduced. The coordination of the accommodating grooves and the outer edge of the differential holder facilitates the fixation of the linkage gear and the differential holder.

Preferably, a threaded oil trough is formed on a radial outer wall of each of two ends of the connecting pole, and threads of the threaded oil troughs at the two ends of the connecting pole are opposite in direction. The threaded oil trough is used for the storage of the lubricant, in order to improve the service life and the practical effect of the bevel gears.

Preferably, the two ends of the connecting pole separately pass through one through hole to extend outside the differential holder and to fit with a circlip for shafts; a third annular groove and a fourth annular groove are formed at each of the two ends of the connecting pole, the third annular groove is used for fitting with the circlip for shafts, and the fourth annular groove of the connecting pole has an outer diameter greater than that of the third annular groove of the connecting pole; the circlip for shafts is an elastic circlip; the two third annular grooves are located between the two fourth annular grooves, and one third annular groove is communicated with one fourth annular groove. Such an arrangement is designed for the fixation of the connecting pole. The arrangement of the third annular groove and the fourth annular groove results in smaller axial movement of the connecting pole, ensuring the structural stability of the differential case.

Preferably, a first linkage shaft is fixed within the reduction gearbox, the first linkage shaft is fixed within the reduction gearbox via a second bearing, and the first linkage shaft is linked with the motor output shaft of the drive motor via a coupling; the coupling comprises a coupling body on which a first coupling hole for fitting with an end of the first linkage shaft and a second coupling hole for fitting the motor output shaft are formed, and the first coupling hole is communicated with the second coupling hole; at an end of the first linkage shaft, a first via hole is formed and a first spring pin is fitted; at an end of the motor output shaft, a second via hole is formed and a second spring spin is fitted; on the coupling body, a first fitting groove for accommodating the first spring pin and a second fitting groove for accommodating the second spring pin are formed; an axis of the first spring pin is perpendicular to an axis of the first linkage shaft, and an axis of the second spring pin is perpendicular to an axis of the motor output shaft; and the axis of the first spring pin is perpendicular to the axis of the second spring pin. The coupling of the present invention is small in size and requires a small space. Thus, a smaller reduction gearbox can be used in the drive axle.

Preferably, the coupling body is made of nylon or glass fiber by injection molding, and an outer wall of the coupling body is recessed inward to form a fifth annular groove in which a metal ring is fitted. Such an arrangement is provided to ensure the strength of the coupling so that the coupling of the present invention has greater torque and the linkage between the motor output shaft and the first linkage shaft becomes more reliable.

The present invention has the advantages of convenient assembly, small size, high precision and stable transmission The reduced size of the reduction gearbox greatly reduces the amount of cast material for the reduction gearbox. Meanwhile, since the space required for assembling the gearbox is reduced, the grease which is covered on the inner wall of the gearbox and used by the lubrication gear is reduced so that the amount of lubricating grease is reduced.

DETAILED DESCRIPTION OF THE INVENTION

The present invention will be further described below by specific embodiments with reference to the accompanying drawings.

As shown in FIGS. 1, 2, 3, 4 and 5, a heavy-duty drive axle of the present invention includes a reduction gearbox 1 and a drive motor; a differential case is provided within the reduction gearbox 1; a first shaft hole for allowing a first output shaft 2 to pass therethrough and a second shaft hole for allowing a second output shaft 3 to pass therethrough are formed on the reduction gearbox 1; the first output shaft 2 and the second output shaft 3 are coaxially arranged; and a motor output shaft of the drive motor is linked with the first output shaft 2 and the second output shaft 3 via the differential case. The differential case consists of a differential holder 4, a connecting pole 5, a linkage gear 6 and four bevel gears; each bevel gear is meshed with two bevel gears; the bevel gears comprise a first bevel gear 11, a second bevel gear 12, a third bevel gear 13 and a fourth bevel gear 14, the first bevel gear 11 and the second bevel gear 12 are arranged oppositely, and the third bevel gear 13 and the fourth bevel gear 14 are arranged oppositely and sheathed on the connecting pole 5; the connecting pole 5 is fixed with the differential holder 4; a cavity is formed within the differential holder 4; a through hole 41 for fitting with the connecting pole 5 is formed on each of an upper side and a lower side of the differential holder, and a third shaft hole 42 and an opening 43 are separately formed on a left side and a right side of the differential holder 4; and the bevel gear is placed in the cavity via the opening. The linkage gear 6 is fixed at the opening of the differential holder 4; the first output shaft 2 passes through the linkage gear 6 to be fixed with the first bevel gear 11 in the cavity, the second output shaft 3 passes through the third shaft hole 42 and is fixed with the second bevel gear 12; and the motor output shaft is linked with the linkage gear 6. Both an inner hole for the first bevel gear 11 and an inner hole for the second bevel gear 12 are fitted with annular splines 19, and spline grooves for fitting with the splines 19 are formed at an end of the first output shaft 2 and an end of the second output shaft 3. An end face of the linkage gear 6 close to the differential holder 4 is recessed inward to form an accommodating groove 65, an inner edge of the accommodating groove 65 is the same as an edge of the differential holder 4 in shape and size, and part of the differential holder 4 is located within the accommodating groove 65.

As shown in FIGS. 1, 2, 3 and 4, an annular protuberance 44, within which the third shaft hole 42 is located, is formed on the left side of the differential holder 4; an annular boss 61 is formed on the linkage gear 6; the first output shaft 2 passes through the annular boss 61 to be fixed with the first bevel gear 11; and both the annular protuberance 44 and the annular boss 61 are fixed with an inner ring of a first bearing 15, and an outer ring of the first bearing 15 is fixed with an inner wall of the reduction gearbox 1.

As shown in FIGS. 1, 2, 3 and 10, a sleeve bearing 7 is fixed within each of the annular protuberance 44 and the annular boss 61; and one sleeve bearing 7 is used for fitting with the first output shaft and the other sleeve bearing 7 is used for fitting with the second output shaft. An adjustment tank running through an interior sleeve bearing hole and an exterior sleeve bearing hole is formed on the sleeve bearing 7, and the adjustment tank runs through end faces of two ends of the sleeve bearing 7 in the axial direction of the sleeve bearing 7; the sleeve bearing 7 is of a bilayer structure, and the sleeve bearing 7 comprises a powder metallurgical layer in an inner layer and a low-carbon steel sleeve 71 in an outer layer; the powder metallurgical layer comprises a first segment 72 composed of polytetrafluoroethylene and lead, and a second segment 73 composed of tin-bronze powder, and the second segment 73 is located between the first segment 72 and the low-carbon steel sleeve 71; and an electroplating layer 74 is formed on the low-carbon steel sleeve 71. The first segment 72 composed of polytetrafluoroethylene and lead has a thickness of 0.01 mm to 0.03 mm; and the second segment 73 composed of tin-bronze powder has a thickness of 0.2 mm to 0.35 mm.

As shown in FIGS. 1, 2, 3, 4, 6 and 7, the linkage gear 6 is fixed with the differential holder 4 via fastening screws 62 and the linkage gear 6 seals the opening 43; a window 45 is formed on each of a front side and a rear side of the differential holder 4, and the windows 45 are located relatively on a radial outer side of the first output shaft 2; several process holes 63 for fitting with the fastening screws 62 are formed on both the differential holder 4 and the linkage gear 6, and the process holes 63 for the differential holder 4 are communicated with the windows 45; and the fastening screws 62 pass through the process holes with head portions of the fastening screws 62 being located within the windows 45.

Figure 2:
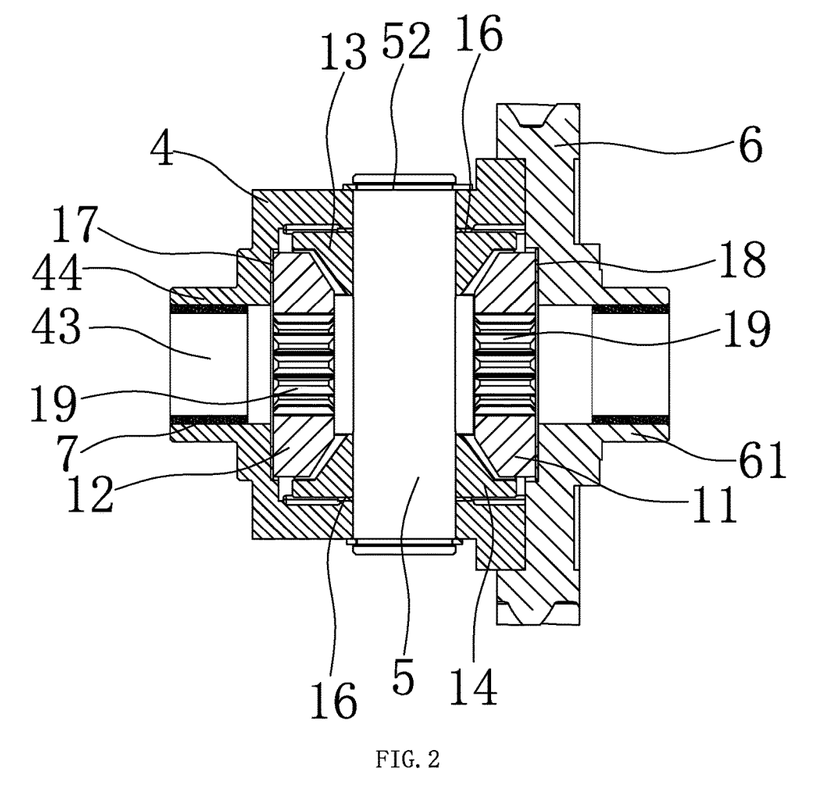
FIG. 2 is a cutaway view of a differential case according to the present invention.
Figure 3:
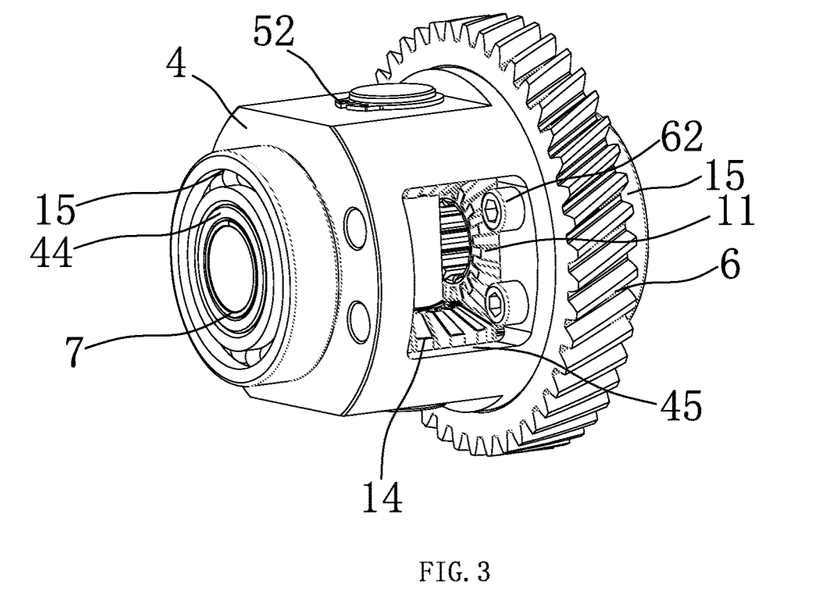
FIG. 3 is an axial side view of the differential case according to the present invention.
Figure 4:
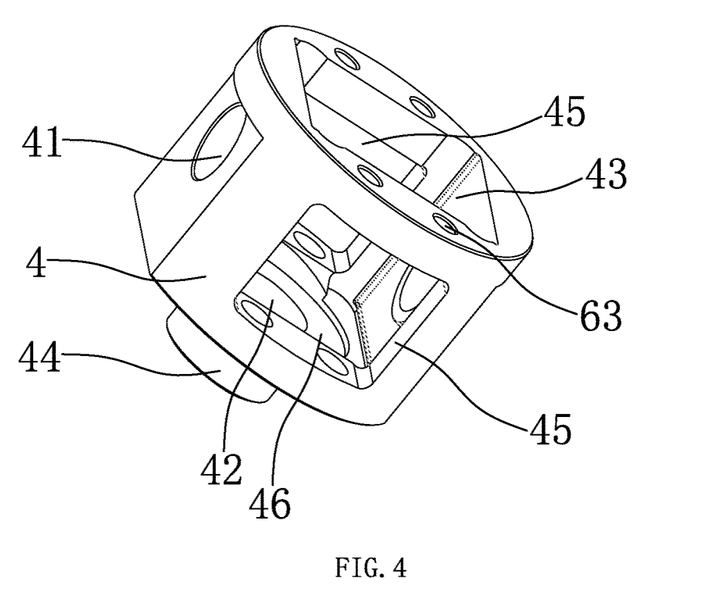
FIG. 4 is a structure diagram of a differential holder according to the present invention.
Figure 5:
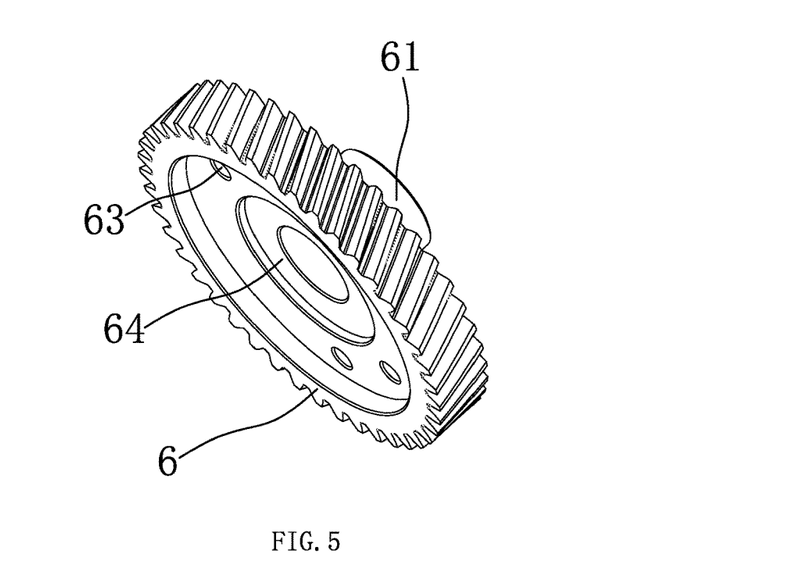
FIG. 5 is a structure diagram of a linkage gear according to the present invention.

Two first gaskets 16 are sheathed on the connecting pole 5, one 16 of which is limited between the third bevel gear 13 and the inner wall of the differential rack 4 and the other one 16 of which is limited between the fourth bevel gear 14 and the inner wall of the differential rack 4; a second gasket 17 is provided between the second bevel gear 12 and the inner wall of the differential rack 4, and a third gasket 18 is provided between the linkage gear 6 and the first bevel gear 11; a first annular groove 46 for accommodating the second gasket 17 is formed on the inner wall of the differential rack 4; an inner diameter of the second gasket 17 is greater than an outer diameter of the second output shaft 3, and an inner diameter of the third gasket 18 is greater than an outer diameter of the first output shaft 2; a second annular groove 64 for accommodating the third gasket 18 is formed on the linkage gear 6; part of the second bevel gear 12 is located within the first annular groove 46, and part of the first bevel gear 11 is located within the second annular groove 64.

Figure 6:
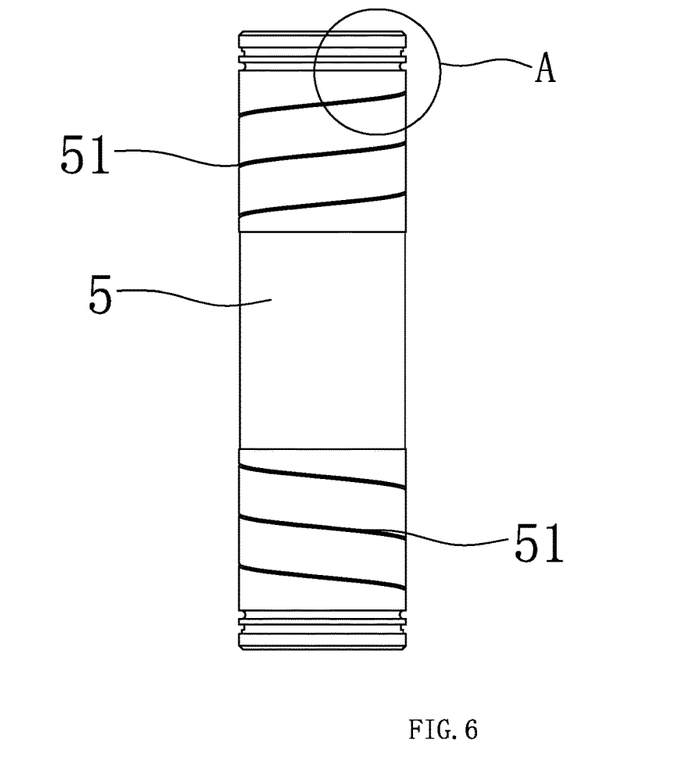
FIG. 6 is a structure diagram of a connecting pole according to the present invention.
Figure 7:
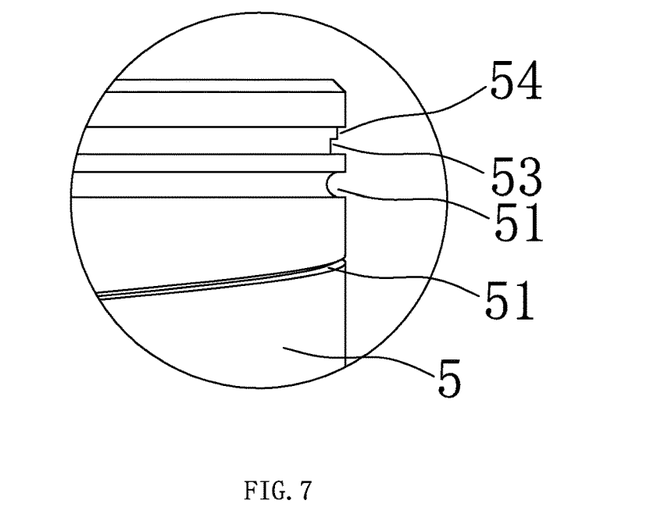
FIG. 7 is an enlarged view of part A of FIG. 6.

A threaded oil trough 51 is formed on a radial outer wall of each of two ends of the connecting pole 5, and threads of the threaded oil troughs 51 at the two ends of the connecting pole 5 are opposite in direction. The two ends of the connecting pole 5 separately pass through one through hole 41 to extend outside the differential rack 4 and to fit with a circlip for shafts 52; a third annular groove 53 and a fourth annular groove 54 are formed at each of the two ends of the connecting pole 5, the third annular groove 53 is used for fitting with the circlip for shafts 52, and the fourth annular groove of the connecting pole 5 has an outer diameter greater than that of the third annular groove of the connecting pole; the circlip for shafts 52 is an elastic circlip; the two third annular grooves 53 are located between the two fourth annular grooves 54, and one third annular groove 53 is communicated with one fourth annular groove 54.

Figure 1:
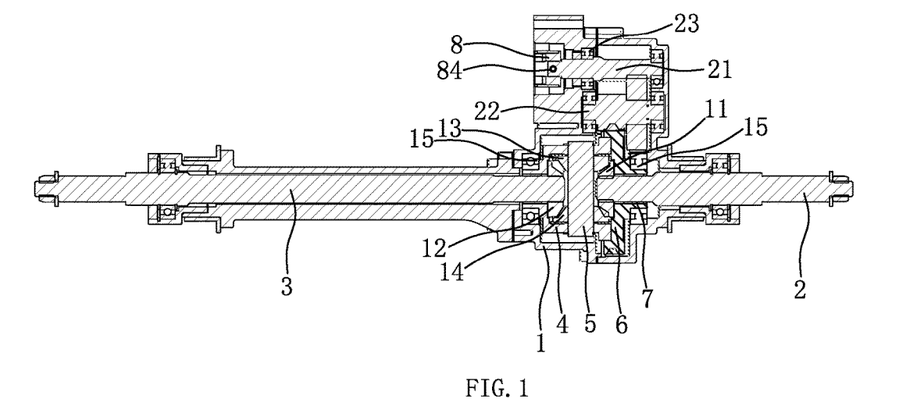
FIG. 1 is a schematic cutaway view of a reduction gearbox according to the present invention.
Figure 8:
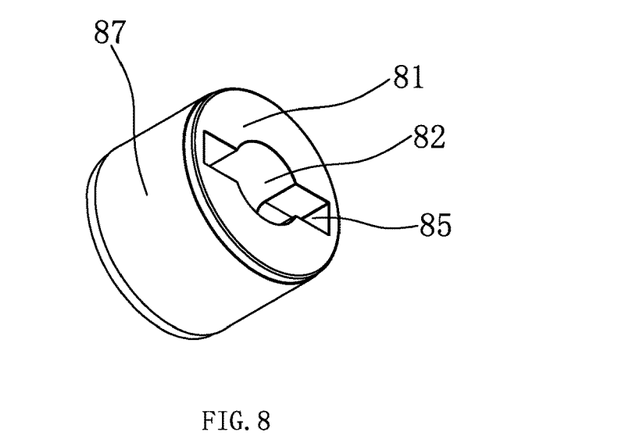
FIG. 8 is a structure diagram of a coupling according to the present invention.
Figure 9:
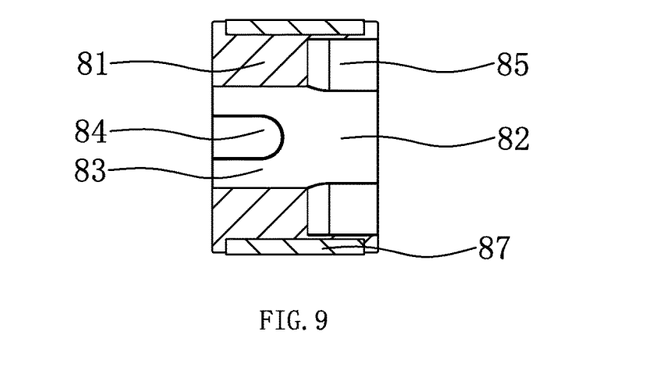
FIG. 9 is a cutaway view of the coupling according to the present invention.
Figure 10:
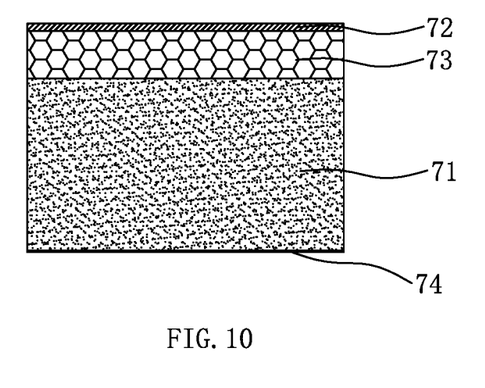
FIG. 10 is a cross-sectional view of a sleeve bearing according to the present invention.

As shown in FIGS. 1, 8 and 9, a first linkage shaft 21 and a second linkage shaft 22 are fixed within the reduction gearbox; reduction gears, which are meshed with each other, are fixed on the first linkage shaft 21 and the second linkage shaft 22; the reduction gear on the second linkage shaft 22 is meshed with the linkage gear 6; and the first linkage shaft 21 rotates to drive the linkage gear 6 to rotate. The first linkage shaft 21 is fixed within the reduction gearbox 1 via a second bearing 23, and the first linkage shaft 21 is linked with the motor output shaft of the drive motor via a coupling 8.

The coupling comprises a coupling body 81 on which a first coupling hole 82 for fitting with an end of the first linkage shaft 21 and a second coupling hole 83 for fitting the motor output shaft are formed, and the first coupling hole 82 is communicated with the second coupling hole 83; at an end of the first linkage shaft 21, a first via hole is formed and a first spring pin 84 is fitted; at an end of the motor output shaft, a second via hole is formed and a second spring spin is fitted; on the coupling body 81, a first fitting groove 85 for accommodating the first spring pin 84 and a second fitting groove 86 for accommodating the second spring pin 84 are formed; an axis of the first spring pin 84 is perpendicular to an axis of the first linkage shaft 21, and an axis of the second spring pin is perpendicular to an axis of the motor output shaft; and the axis of the first spring pin 84 is perpendicular to the axis of the second spring pin. The coupling body 81 is made of nylon or glass fiber by injection molding, and an outer wall of the coupling body 81 is recessed inward to form a fifth annular groove in which a metal ring 87 is fitted.

In the present invention, the four bevel gears are assembled together by the coordination of the differential rack, the connecting pole and the linkage gear, and the four bevel gears are relatively fixed by the meshing of the four bevel gears with each other and the coordination with the connecting pole. During the assembly of the drive axle of the present invention, the differential case is placed within the reduction gearbox, and then the first output shaft and the second output shaft are assembled and fixed. The assembly process is quite convenient, the structure is simple, and the size of the reduction gearbox can be reduced. Furthermore, the manufacturing and machining of the reduction gearbox becomes simpler. Sealing the opening of the differential rack by the linkage gear prevents the disengagement of the first bevel gear. The linkage gear is also used for linking with the motor output shaft. The coordination of the connecting pole and the four bevel gears ensures that the other output shaft can still rotate when one output shaft is locked, so that the steering of the scooter is realized. Furthermore, the non-locked output shaft can be allowed to rotate at double speed. The coupling of the present invention is small in size and requires a small space. Thus, a smaller reduction gearbox can be used in the drive axle. Furthermore, the coupling of the present invention has greater torque and the linkage between the motor output shaft and the first linkage shaft becomes more reliable.

The invention claimed is:

1. A heavy-duty drive axle comprising a reduction gearbox and a drive motor; a differential case is provided within the reduction gearbox; a first shaft hole for allowing a first output shaft to pass therethrough and a second shaft hole for allowing a second output shaft to pass therethrough are formed on the reduction gearbox; a motor output shaft of the drive motor is linked with the first output shaft and the second output shaft via the differential case; the differential case consists of a differential holder, a connecting pole, a linkage gear and four bevel gears; each bevel gear is meshed with two bevel gears; the bevel gears comprise a first bevel gear, a second bevel gear, a third bevel gear and a fourth bevel gear, the first bevel gear and the second bevel gear are arranged oppositely, and the third bevel gear and the fourth bevel gear are arranged oppositely and sheathed on the connecting pole; the connecting pole is fixed with the differential holder; a cavity is formed within the differential holder; a through hole for fitting with the connecting pole is formed on each of an upper side and a lower side of the differential holder, and a third shaft hole and an opening are separately formed on a left side and a right side of the differential holder; the bevel gear is placed in the cavity via the opening; the linkage gear is fixed at the opening of the differential holder; the first output shaft passes through the linkage gear to be fixed with the first bevel gear in the cavity, the second output shaft passes through the third shaft hole and is fixed with the second bevel gear; and the motor output shaft is linked with the linkage gear;

wherein, a first linkage shaft is fixed within the reduction gearbox, the first linkage shaft is fixed within the reduction gearbox via a second bearing, and the first linkage shaft is linked with the motor output shaft of the drive motor via a coupling; the coupling comprises a coupling body on which a first coupling hole for fitting with an end of the first linkage shaft and a second coupling hole for fitting the motor output shaft are formed, and the first coupling hole is communicated with the second coupling hole; at an end of the first linkage shaft, a first via hole is formed and a first spring pin is fitted; at an end of the motor output shaft, a second via hole is formed and a second spring pin is fitted; on the coupling body, a first fitting groove for accommodating the first spring pin and a second fitting groove for accommodating the second spring pin are formed; an axis of the first spring pin is perpendicular to an axis of the first linkage shaft, and an axis of the second spring pin is perpendicular to an axis of the motor output shaft and the axis of the first spring pin is perpendicular to the axis of the second spring pin.

2. The heavy-duty drive axle according to claim 1, characterized in that an annular protuberance, within which the third shaft hole is located, is formed on the left side of the differential holder; an annular boss is formed on the linkage gear; the first output shaft passes through the annular boss to be fixed with the first bevel gear; and both the annular protuberance and the annular boss are fixed with an inner ring of a first bearing, and an outer ring of the first bearing is fixed with an inner wall of the reduction gearbox.

3. The heavy-duty drive axle according to claim 2, characterized in that a sleeve bearing is fixed within each of the annular protuberance and the annular boss; one sleeve bearing is used for fitting with the first output shaft and the other sleeve bearing is used for fitting with the second output shaft; an adjustment tank running through an interior sleeve bearing hole and an exterior sleeve bearing hole is formed on the sleeve bearing, and the adjustment tank runs through end faces of two ends of the sleeve bearing in the axial direction of the sleeve bearing; the sleeve bearing is of a bilayer structure, and the sleeve bearing comprises a powder metallurgical layer in an inner layer and a low-carbon steel sleeve in an outer layer; the powder metallurgical layer comprises a first segment composed of polytetrafluoroethylene and lead, and a second segment composed of tin-bronze powder, and the second segment is located between the first segment and the low-carbon steel sleeve; and an electroplating layer is formed on the low-carbon steel sleeve.

4. The heavy-duty drive axle according to claim 1, characterized in that two first gaskets are sheathed on the connecting pole, one of which is limited between the third bevel gear and the inner wall of the differential holder and the other one of which is limited between the fourth bevel gear and the inner wall of the differential holder; a second gasket is provided between the second bevel gear and the inner wall of the differential holder, and a third gasket is provided between the linkage gear and the first bevel gear; a first annular groove for accommodating the second gasket is formed on the inner wall of the differential holder; an inner diameter of the second gasket is greater than an outer diameter of the second output shaft, and an inner diameter of the third gasket is greater than an outer diameter of the first output shaft; a second annular groove for accommodating the third gasket is formed on the linkage gear; part of the second bevel gear is located within the first annular groove, and part of the first bevel gear is located within the second annular groove.

5. The heavy-duty drive axle according to claim 1, characterized in that both an inner hole for the first bevel gear and an inner hole for the second bevel gear are fitted with splines, and spline grooves for fitting with the splines are formed at an end of the first output shaft and an end of the second output shaft; and an end face of the linkage gear close to the differential holder is recessed inward to form an accommodating groove, an inner edge of the accommodating groove is the same as an edge of the differential holder in shape and size, and part of the differential holder is located within the accommodating groove.

6. The heavy-duty drive axle according to claim 1, characterized in that a threaded oil trough is formed on a radial outer wall of each of two ends of the connecting pole, and threads of the threaded oil troughs at the two ends of the connecting pole are opposite in direction.

7. The heavy-duty drive axle according to claim 1, characterized in that the coupling body is made of nylon or glass fiber by injection molding, and an outer wall of the coupling body is recessed inward to form a fifth annular groove in which a metal ring is fitted.

* * * * *